April 16, 1963  H. W. PRICE  3,085,439
GAS SAMPLING APPARATUS
Filed Jan. 7, 1960
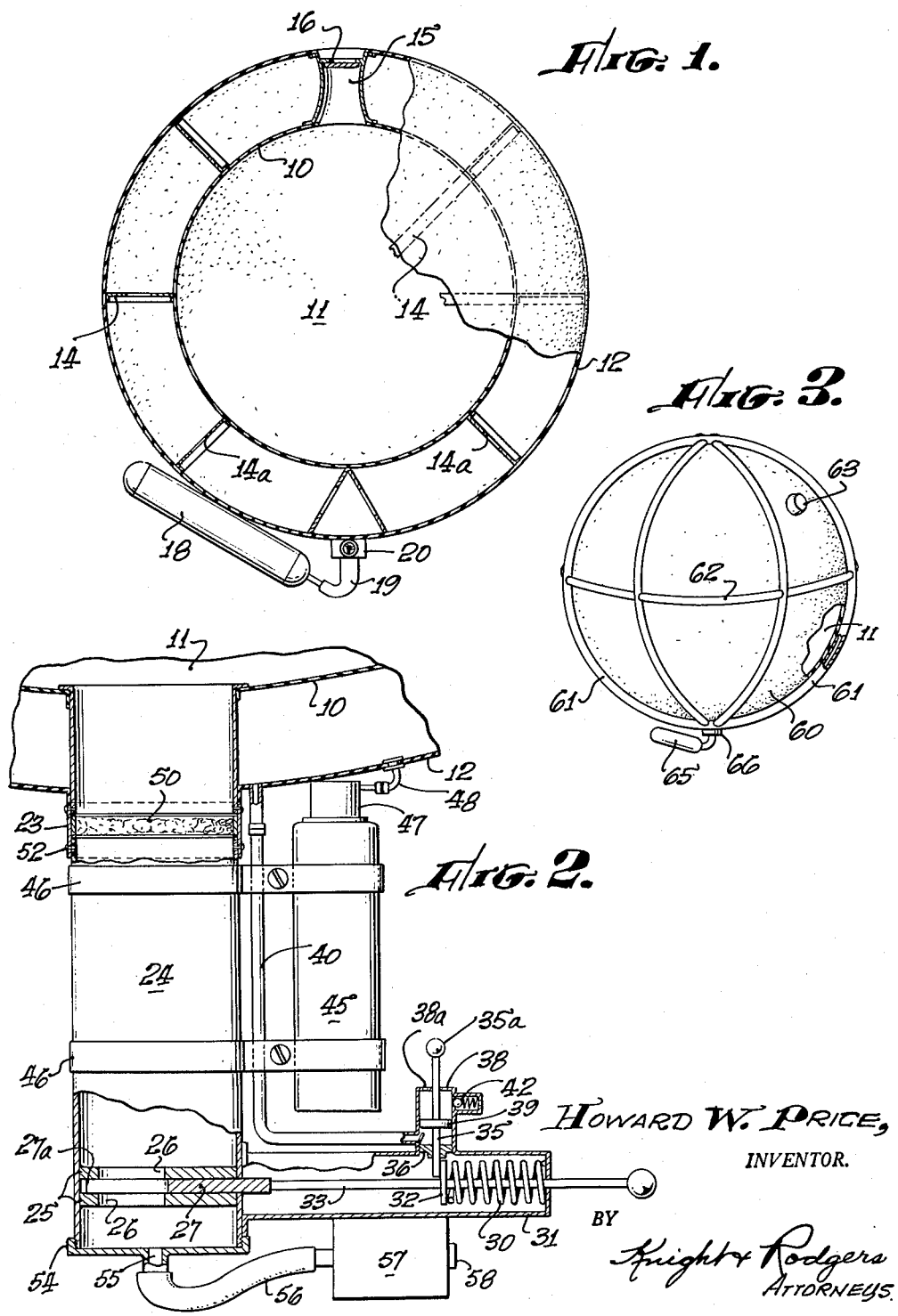
HOWARD W. PRICE,
INVENTOR.
BY
Knight + Rodgers
ATTORNEYS.

United States Patent Office 3,085,439
Patented Apr. 16, 1963

3,085,439
GAS SAMPLING APPARATUS
Howard W. Price, Granada Hills, Calif., assignor to Joy Manufacturing Company, Pittsburgh, Pa., a corporation of Pennsylvania
Filed Jan. 7, 1960, Ser. No. 1,117
7 Claims. (Cl. 73—421.5)

The present invention relates generally to gas sampling devices and more especially to devices of this character which are particularly suited to taking samples of atmospheric air under a wide variety of conditions.

Samples of atmospheric air may be taken for any one or more of a number of purposes which are served by obtaining a sample of known volume for analytical purposes. One of the most common reasons why air samples are taken is in connection with the investigation of air pollution which is now widely of concern. Air samples have to be taken at different places in order to permit analysis of the air constituents for the purpose of determining what pollutants are in the air; and sometimes it is advisable to repeat sampling procedures at intervals of time at the same position. This permits a determination of changing character of the atmospheric constituents.

Another example of a need for taking air samples is in the determination of radioactive fallout. Here, air samples may be taken at a number of positions and may be repeated in one or more of those positions at given intervals of time. While these are examples of the purposes for which air samples may be taken, it will be understood that such purposes or analytical procedures as may be involved are in no way limitative upon the present invention.

Likewise, while air samples for many purposes are taken at ground level, there may be also reasons for taking samples at substantial distances above the earth's surface. For these purposes the sampling apparatus may be carried aloft by any suitable means, as for example, an airplane or a balloon.

Gas sampling devices are not new in a broad sense but most of them are not suited to the collection of large samples of atmospheric air. A typical gas sampling device of the prior art consists of a rigid bottle which may be evacuated and, upon being opened to the atmosphere, is then filled with the gas sample. However, for many purposes, this device is inadequate because it cannot be economically made large enough to obtain a relatively large volume of air in the sample. This may be desired not only because a larger volume of the sample insures a more typical sample but also because a small concentration of some of the constituents requires that a relatively large sample be taken in order that enough of the constituent is present for analytical purposes. Under these conditions, the typical rigid bottle becomes so large that it is no longer easily portable and would necessarily be very heavy and expensive if it were strong enough to resist collapsing when evacuated prior to drawing in the sample.

Thus it becomes a general object of my invention to provide air sampling apparatus which meets the various requirements of equipment of this character and is versatile in its uses.

It is a further object of my invention to provide air sampling apparatus of this character which is very light in weight and easily portable.

A further object of the invention is to provide an air sampling apparatus of this character which is adapted to taking a sample of comparatively large volume without imposing any limitations upon portability of the device.

A further object of the invention is to provide air sampling apparatus of this general character which is adapted to automatic operation or remote control.

It is also an object of the invention to provide a device that may be used in conjunction with a filter or other test or analytical apparatus to retain particulate material or other constituent taken from a measured sample of air contained in the sampler.

These objects are attained according to my invention by providing flexible wall means which is collapsible to substantially zero internal volume but when distended defines a totally enclosed sample chamber. A valve controlled passage means extends from the sample chamber inside the wall means to the exterior of the sampling device in order to admit and retain in the sampling chamber a sample of air or other gas. Inflatable means is connected to the wall means, which, upon being filled with gas under pressure expands and distends the wall means to expand the sample chamber to its normal volume and at the same time to draw into it a sample of the ambient air or other gas.

In a preferred embodiment, the gas sampling device comprises a double-walled, spherical member, the inner wall being a flexible wall means. The outer wall is connected to the inner wall by some webs and provides the inflatable means which distends the wall of the sample chamber. In order to make the device completely portable and self-contained, there is included a source of gas under pressure, in the form of a flask or bottle filled with a suitable gas, connected to the inflatable wall means. A valve is provided to regulate the flow of gas into the space to inflate the device. This valve may be manually controlled in a simplified form of device or it may be provided with means for automatic or remote control if such is desired.

Added sampling equipment may be used, such as a filter or means for washing the gas or absorbing some constituent therefrom. Such items are optional.

How the above and other objects and advantages of my invention are attained will be more readily understood by reference to the following description and to the annexed drawing in which:

FIG. 1 is a partly in section and partly in side elevation of the spherical gas sampling device embodying a preferred form of my invention.

FIG. 2 is an enlarged fragmentary view, partly in section and partly in side elevation, of a variational form of valve controlling admission of the air sample to the sampling chamber and mechanism for operating the valve.

FIG. 3 is a side elevation of a spherical member of variational construction.

Referring now to the drawing, there is shown in FIG. 1 an embodiment of my invention which includes an inner spherical wall 10. This wall is a flexible, collapsible member capable of being distended to a predetermined shape and volume. Preferably the shape is essentially that of a sphere; and when so distended, wall 10 totally encloses the sample chamber 11 consisting of the space within wall 10.

Surrounding and spaced from wall means 10 is a similar wall 12 which is likewise flexible and collapsible. This wall when distended assumes a similar spherical shape. The two walls are connected together by a number of non-elastic webs 14 which preferably have openings 14a in them or other means for providing communication between the several compartments thus established between the webs.

A passage 15 extends from sample chamber 11 to the exterior of the sampling device and is provided with a valve 16. In this embodiment, valve 16 is a simple form of check valve comprising a flap which allows gas to flow into sample chamber 11 when the exterior pressure is greater than the pressure within the sample chamber but which closes when the pressure in the sample chamber is equal to or greater than the ambient pressure. When closed, valve 16 retains within the sample chamber the sample of gas admitted through passage 15.

Wall 12 provides an inflatable means which can be distended to expand the sample chamber. Although other means may be provided, I prefer to provide a cylinder 18 filled with compressed air or other suitable gas under pressure connected by fitting 19 to the space between the two walls 10 and 12. Flow of gas from cylinder 18 into this space is regulated by valve 20 which in a simple form of the invention may be a manual valve. When turned to the open position, gas flows out of the cylinder through fitting 19 to fill the inter-wall space between the inner and outer walls. Since the pressure exerted by the gas in this space on both the inner and outer walls is the same per unit area, but the area of the outer wall is greater than that of the inner wall, the wall 12 distends under the influence of the gas pressure and through the medium of webs 14 pulls the inner wall 10 into the distended position as shown.

In operation, the sampling device can be collapsed completely so that the volume of sample chamber 11 is reduced to zero or substantially so. By admitting gas under pressure into the inter-wall space, the wall means defining the sampling chamber is distended and the sample chamber enlarged, causing the sample chamber to be filled with a sample of the ambient atmosphere. The sample chamber will fill to a pressure substantially equal to the ambient atmosphere, at which time valve 16 closes, retaining within the sample chamber the desired sample. Gas cylinder is detachably connected so that it can be replaced, when empty, by a full cylinder, permitting the sampler to be used again.

The embodiment of my invention just described is a simplified form, suitable for manual operation at ground level. In the event that the sampling device is to be operated at a time or place when it is unattended, it may be desired to make additional provision for automatic or remote operation of the device.

It may be desired for various reasons to provide a different type of valve structure. More complex valves are required under various circumstances, as for example when filling the sample chamber above ground level or under conditions such that the chamber will not be emptied under supervision within a short length of time. One purpose of such a valve structure is to assure that the original sample is not contaminated by accidental admission of other air from outside the sampler or is not reduced in volume by accidental discharge of a portion of the initial sample.

An arrangement suitable for attaining these objectives is illustrated in FIG. 2. This arrangement is attached to flexible wall means 10 and 12 constructed as previously described.

Here the passage means extending from the sample chamber 11 to the exterior of the collapsible sampling device is provided by tube 24 which is made in two sections connected by a collar 23 into which each tube section slides with a snug fit. The tube extends for a distance beyond the outer wall. Inside tube 24 is a pair of spaced plates 25 having aligned openings 26. Between the two plates 25 is the sliding valve 27 which can be moved to the open position of FIG. 2 in which apertures 26 are uncovered in order to admit air from outside the sampling device into sample chamber 11. By moving slide valve 27 to the left in the drawing, it closes the apertures 26 and effectively seals the interior of the sampling device so that air cannot pass in either direction through the passage means.

Valve 27 is biased toward a normally closed position by spring 30 contained in housing 31 against which one end of the spring bears. The other end of the spring 30 bears against plate 32 firmly attached to valve operating rod 33 so that when spring 30 is free to expand from the position shown in FIG. 2, it exerts a force on plate 32 and rod 33 that moves slide valve 27 to the closed position.

Valve 27 can be held in the open position by the keeper 35 suitably mounted in guide 36 to slide in a direction normal to the path of travel of plate 32. When keeper 35 projects into the path of plate 32, the two members engage and valve 27 is thereby held in the open position, as shown. When keeper 35 is retracted by moving upwardly in the drawing, valve 27 is free to move to closed position under the force exerted by spring 30.

The movement of keeper 35 to a position releasing valve 27 may conveniently be accomplished in response to the existence of a predetermined pressure within the inflatable wall 12. For this purpose there is provided cylinder 38 in which piston 39 reciprocates. At one side of piston 39, cylinder 38 is connected by tubing 40 to the interwall space between walls 10 and 12. As this space fills with gas, gas passes through tube 40 into cylinder 38 where it exerts a force on piston 39 in the direction to retract keeper 35. The parts are so proportioned that when the maximum gas pressure necessary to distend outer wall 12 to the desired dimensions is attained, the pressure exerted on the underside of piston 39 is sufficient to lift the piston in cylinder 38, thereby permitting valve 27 to close. Keeper 35 preferably projects outside of cylinder 38 to provide a handle 35a by which the piston can be manually manipulated.

In order to avoid trapping air in cylinder 38 in front of the upwardly moving piston 39, the end wall of cylinder 38 is provided with vent opening 38a which allows the piston to move freely to the far end of the cylinder. When the piston has reached the end of the cylinder, it has passed relief valve 42 so that the valve is exposed to the air in cylinder 38 that is urging piston 39 upwardly. Valve 42 is preferably a spring loaded ball check valve, or the equivalent thereof, which opens in the event that the pressure in the inner space between walls 10 and 12, which is the same as the pressure in cylinder 38, exceeds a predetermined pressure, preferably some pressure higher than the pressure at which piston 39 is actuated. Relief valve 42 is a safety measure and permits the gas supply to be large enough to insure that the wall means 12 is fully inflated but without danger of over inflation as valve 42 bleeds off excess pressure. This may be of especial value in the case of taking a sample at a high altitude where the external pressure is low and the pressure within wall 12 is therefore limited.

As a source of gas over pressure to inflate wall means 12, there is provided a small tank 45 filled with compressed air or other gas under suitable pressure. Tank 45 is mounted by straps 46 on tube 24, but any other suitable means for mounting the gas supply may be used. Mounted on the outlet from the tank is valve 47 which in turn is connected by pipe 48 to the space inside wall means 12. Thus the gas is supplied to the inflatable wall means through conduit 48, gas flow being regulated by valve 47. Since this type of device is designed especially for automatic or remote controls, valve 47 may include electrical or mechanical valve operating means. Such means may include a clock mechanism designed to open the valve at a predetermined time or it may include electrical circuit means which opens the valve in response to an electrical or radio signal. If it is desired to take a gas sample at a given altitude above the earth's surface or at a given atmospheric pressure, valve 47 may be actuated by pressure responsive mechanism. A wide variety of mechanisms adapted to open the valve regulating gas flow into the inflatable wall means may be designed by persons skilled in the art; and since the details of these mechanisms are not essential to an understanding of the present invention, they are not disclosed in detail.

Various optional features are also shown in FIG. 2. Tube 24 has inside it an interstitial filter 50, of glass wool, paper, or other suitable material. This filter is conveniently mounted inside collar 23 and between the two sections of inlet tube 24 where it can be easily removed and replaced. If no filter is used the two tube sections abut each other. Collar 23 may be attached to the tube in any suitable way, as by set screws 52 or the like, which permit the outer tube section to be held firmly in place yet be easily removable.

Filter 50 removes and retains particulate material in the sample of gas drawn through tube and into sample chamber 11 by the expanding wall member 10.

The outer end of tube 24 may be open if desired; but it is here shown as covered by screw cap 54 having an inlet 55 connected by tubing 56 to housing 57. The housing has a gas inlet at 58. Housing 57 may enclose any other device for removing and retaining any constituent, particulate or gaseous, in the gas sample drawn into sample chamber 10. This housing may contain a filter in place of filter 50. Or it may contain some chemical reagent that will react with a constituent of the sample taken by the device. This latter arrangement contemplates separation of constituents of the sample at the time of taking the sample or some analytical work on the sample as it is introduced into the device rather than waiting until a later time. The filter at 50 and the housing 57 are optional features that may be omitted if not needed.

A variational embodiment of my invention is illustrated in FIG. 3. In this form of the invention the flexible, collapsible wall means is again preferably spherical in shape, resembling in this respect the wall means 10 already described. However, the inflatable means for distending wall means 60 comprises a skeleton or framework of flexible tubular members 61 and 62. The members 61 lie in diametral planes and intersect one another at the poles of the sphere, where they are inter-connected so that gas can flow from one to another. The frame member 62 is an equitorial member which is connected to and extends transversely of the frame members 61.

All of these frame members are connected to the exterior surface of flexible wall 60 which defines the sample chamber 11. Frame members 61 and 62 are collapsible so that the entire device may be collapsed to reduce to substantially zero the volume of the sample chamber. When inflated over suitable pressure, the frame members 61 and 62 distend to a generally spherical shape and, being connected to wall means 60, cause the latter means to likewise expand and draw into the interior space a sample of ambient air. The valve controlled passage is located at 63 to admit ambient air into the sample chamber. Gas for inflating the framework is supplied from cylinder 65 which is connected to the framework in a manner to supply gas to the interiors of elements 61 and 62, gas flow being controlled by a valve at 66. This valve may be opened manually or by mechanical means as desired.

Of course the valve mechanism illustrated in FIG. 2, or parts thereof, may be combined with the spherical wall means 60 and skeleton frame 61, 62, if desired.

From the foregoing description of a preferred embodiment of my invention and various modifications therein, it will be apparent that other changes and modifications may be made by persons skilled in the art without departing from the spirit and scope of my invention. Accordingly it is to be understood that the foregoing description is considered to be illustrative of, rather than limitative upon, the invention as defined in the appended claims.

I claim:
1. A gas sampling device comprising:
flexible collapsible wall means defining when distended a totally enclosed sample chamber;
passage means extending from the sample chamber to the exterior of the device to admit in the chamber a sample of gas;
valve means in said passage means adapted to admit a sample of air to the sample chamber and to prevent loss of the sample from the chamber;
and inflatable means non-elastically connected to said wall means to distend the wall means upon filling said inflatable means with gas under pressure.

2. A gas sampling device as in claim 1 in which the valve means is biased to a normally closed position, and which includes releasable detent means holding the valve open; and means releasing said detent when the wall means is substantially fully distended.

3. A gas sampling device as in claim 1 which also includes means for separating a constituent from gas entering the sample chamber and retaining said constituent.

4. A gas sampling device as in claim 3 in which the last mentioned means is located within the passage means.

5. A gas sampling device comprising: flexible collapsible wall means defining when distended a totally enclosed sample chamber; valve controlled passage means extending from the sample chamber to the exterior of the device to admit and retain in the chamber a sample of gas; a normally open valve in said passage means; inflatable means non-elastically connected to said wall means to distend the wall means upon filling said inflatable means with gas under pressure; a source of gas under pressure connected to said inflatable means; and means closing said normally open valve in response to a predetermined pressure in said inflatable means.

6. A gas sampling device comprising: a collapsible, double-walled sample holder defining inside the inner wall a sample chamber; valve controled passage means extending from the sample chamber to the exterior of the device to admit and retain a sample in the chamber; and means for introducing gas under pressure into the space between the walls of the holder, comprising a tank of gas under pressure and valve means regulating the flow of gas from the tank into the inter-wall space to distend the holder and expand the chamber to draw therein a sample of ambient gas.

7. A gas sampling device comprising: a collapsible, double-walled sample holder defining inside the inner wall a sample chamber; valve controled passage means extending from the sample chamber to the exterior of the device to admit and retain a sample in the chamber; and means for introducing gas under pressure into the space between the walls of the holder, comprising a tank of gas under pressure and valve means regulating the flow of gas from the tank into the inter-wall space to distend the holder and expand the chamber to draw therein a sample of ambient gas; and valve actuating means for operating said last mentioned valve in response to a remotely generated signal.

References Cited in the file of this patent

UNITED STATES PATENTS

| | | |
|---|---|---|
| 2,223,785 | Hassler | Dec. 3, 1940 |
| 2,927,383 | Longino | Mar. 8, 1960 |
| 2,943,490 | Melton | July 5, 1960 |

FOREIGN PATENTS

| | | |
|---|---|---|
| 558,123 | Germany | July 17, 1931 |